June 9, 1959 L. H. GLASSMAN ET AL 2,889,746
EXPLOSIVE BOLT TYPE STORE SUSPENSION SYSTEM FOR AIRCRAFT
Filed Nov. 10, 1954 2 Sheets-Sheet 1
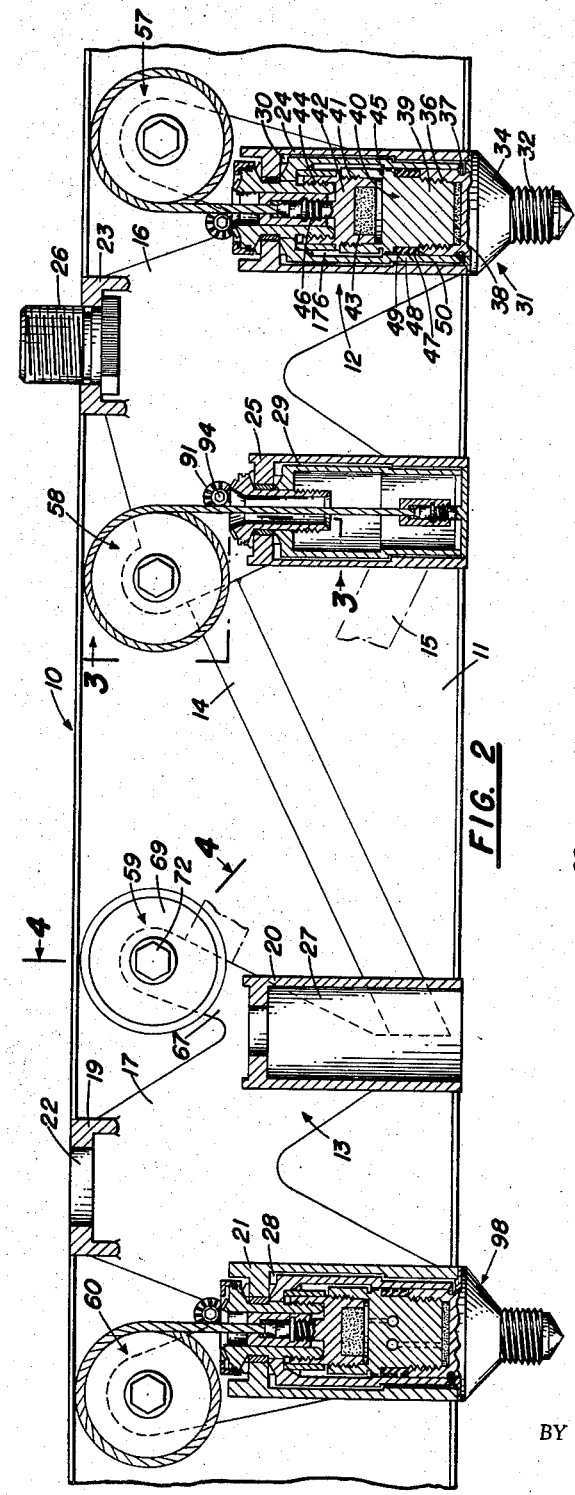
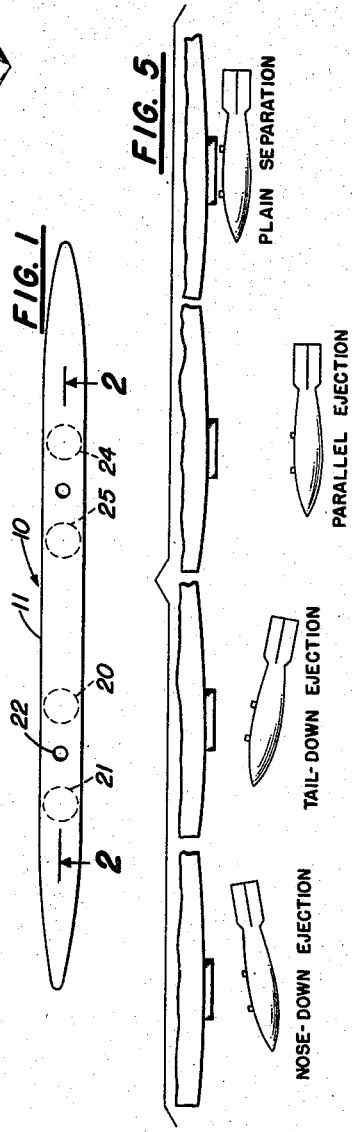
INVENTORS
KARL E. SCHUESSLER
LOUIS H. GLASSMAN
ROBERT E. KEMELHOR
BY
ATTORNEYS

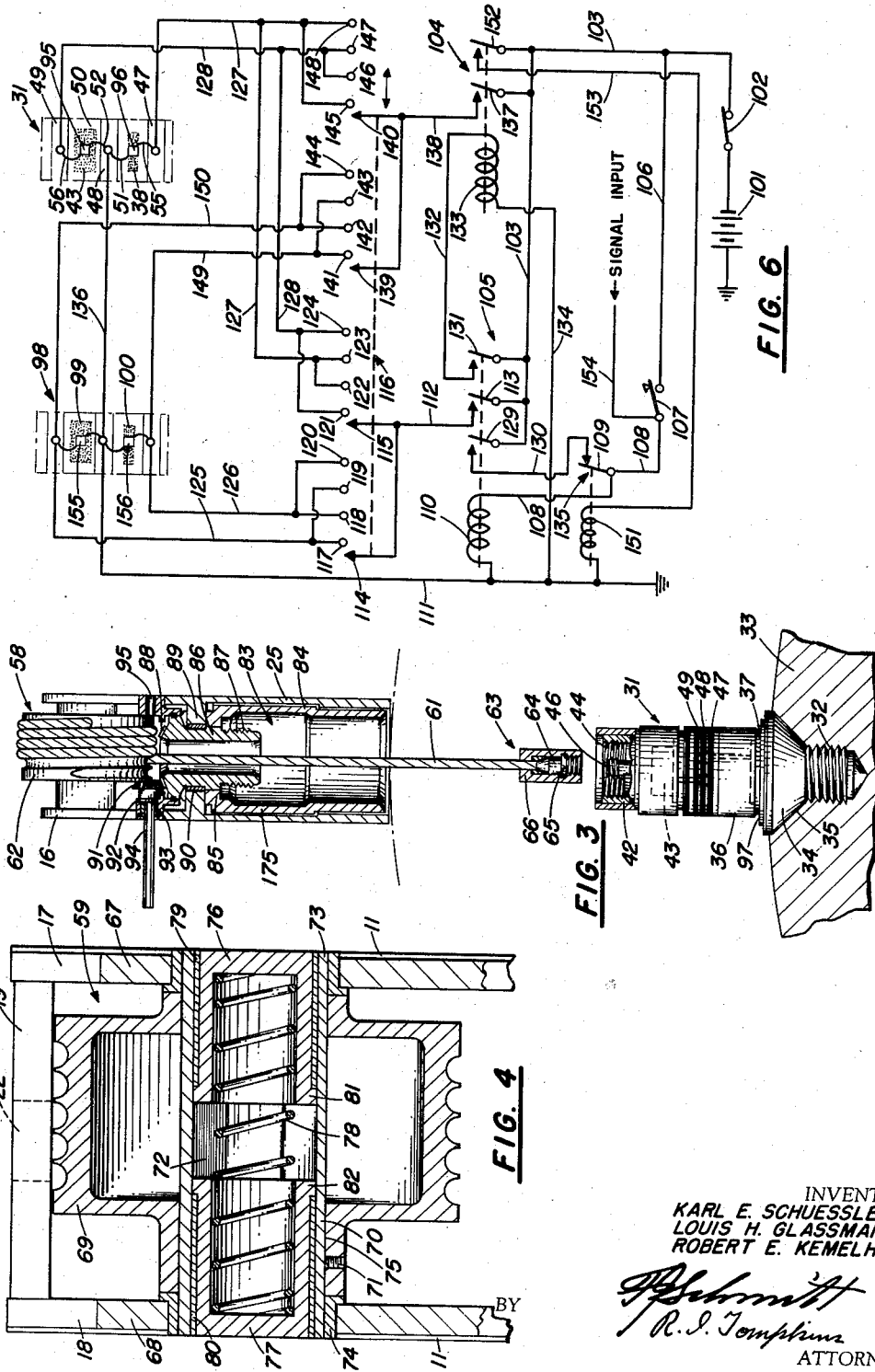

2,889,746

EXPLOSIVE BOLT TYPE STORE SUSPENSION SYSTEM FOR AIRCRAFT

Louis H. Glassman, Arlington, Va., Robert E. Kemelhor, Long Island, N.Y., and Karl E. Schuessler, Philadelphia, Pa.

Application November 10, 1954, Serial No. 468,174

7 Claims. (Cl. 89—1.5)

(Granted under Title 35, U.S. Code (1952), sec. 266)

The invention described herein may be manufactured and used by or for the Government of the United States of America for governmental purposes without the payment of any royalties thereon or therefor.

This invention relates to suspension apparatus which is used for holding and then releasing or forcibly ejecting stores from high speed aircraft or other types of moving or stationary structures.

The conventional way of suspending and releasing stores such as bombs, mines, torpedoes, cargo pods, etc. from aircraft is to use a bomb rack alone or with a bomb ejector. When the bomb rack is used alone the bomb is adapted to be released, that is, it is allowed to drop from the aircraft by its own weight. When the bomb ejector is used in conjunction with the bomb rack, the bomb is forcibly ejected from the aircraft by the ejector after it is released by the bomb rack. The bomb rack is essentially a mechanism which contains one or more hooks which are latched to lugs which are affixed to the store. When a simple release of the store is desired, the hooks are remotely actuated by electro-mechanical means by a bombardier or pilot. These hooks are thereby caused to become unlatched from the lugs on the store and the store is thereby released. On the other hand, when it is desired to forcibly eject the store from the aircraft, ejection is obtained by the use of a separate linkage which operates in sequence with the hooks of the bomb rack and serves to push the store away from the aircraft after the hooks are unlatched from the store. In addition to the aforementioned hooks, which take the vertical loads, sway braces must be added to the conventional apparatus to take out the side load, vertical up loads together with yawing, pitching and rolling moments.

The aforedescribed conventional bomb release and ejector systems have certain disadvantages. The bomb release hooks, which are in constant use, are subject to frequent fatigue and tensile failures which in turn result in an inadvertent release of the store. Furthermore, bomb racks and forcible ejectors are complicated and highly stressed mechanisms which contain multiple linkages and moving parts. This multiplicity of moving parts frequently results in failures to release under icing, salt spray, sand, and other adverse environmental conditions. It has also been found that by suspending stores from hooks and lugs it becomes necessary to add sway braces for the purpose of taking out side load, vertical up loads together with yawing, pitching and rolling moments. These sway braces are heavy and cause high stress concentrations over a large part of the store case. If the sway braces are used in conjunction with the type of stores which are fastened to the wings of an aircraft, it has been found that they cause undesirable aerodynamic drag. It is further noted that existing suspension mechanisms, because of the multiplicity of linkages and moving parts, are subject to inadvertent releasing under shock. Furthermore existing store suspension systems are costly and extremely difficult to manufacture. It is also noted that with conventional store racks, external lifts or hoists must be used to bring the store into position on the aircraft. This necessitates careful alignment and skillful manipulation of the store.

The store suspension apparatus of this invention overcomes the disadvantages of conventional store releasing systems. Basically, the instant store suspension apparatus consists of a pylon which is adapted to be rigidly attached to the underside of the wing of an aircraft. This pylon consists of a narrow streamlined fairing and contains two or more spaced housings. Explosive bolts having a plurality of explosive charges of different strength therein are attached to the store in spaced relationship to each other. Hoisting means positioned within the pylon are then attached to the explosive bolts and the store is lifted into engagement with the pylon so that the explosive bolts, which are attached to the store, fit into the spaced housings in the pylon. Means are provided within the housings of the pylon for attachment to the bolts which are attached to the store. A flange is mounted on each bolt which cooperates with the store and pylon in such a manner as to minimize the detrimental effect of the side loads of the store. This flange serves in lieu of sway braces which were required in prior art constructions. Suitable detonating means are provided to selectively explode the various charges in the bolts thereby fracturing the bolts and effecting either release or ejection of the store from the pylon, as desired. As briefly mentioned above, each of the explosive bolts contains a plurality of powder charges of different explosive force which can be exploded independently of each other. Each of the explosive bolts which is affixed to the store is adapted to fit within an ejection tube mounted in the pylon. If plain separation of the store is desired, a separation charge in each explosive bolt is detonated to fracture each bolt, and the gases produced by detonation are vented to the atmosphere without giving any ejection characteristic to the store. On the other hand, if forcible ejection of the store is desired, an ejection charge in each explosive bolt is detonated to fracture each bolt, and the gases produced by detonation are confined within a pressure chamber formed in the ejection tube in which the explosive bolt is housed. The ejection force applied to the store depends on the following variables: The size of the ejection charge in the explosive bolt, the volume of the pressure chamber, and the length of the stroke of the fracture portion of the explosive bolt in the ejection tube. By changing the values of the aforementioned variables relative to each other, suitable ejection characteristics can be obtained for any type of store. Furthermore, the detonating means are constructed in such a manner so as to allow a separation charge in one bolt to be exploded at the same time that an ejection charge in another bolt is exploded. In this manner either tail down or nose down ejection of the store may be achieved to combat different store pitching moments. Furthermore, an emergency secondary release is provided in the detonating system whereby, if for some reason primary detonation does not separate the store from the aircraft, secondary detonation will accomplish the required release.

It is accordingly one object of this invention to disclose improved store suspension apparatus utilizing explosive bolts to release or eject the store.

It is another object of this invention to disclose store suspension apparatus in which suspension, sway bracing, and separation of the store are all accomplished by one member, namely the explosive bolt, at one small area of the store thereby eliminating unnecessary weight and simplifying structural design.

It is still another object of this invention to disclose an explosive bolt, for use with store suspension apparatus, which contains a plurality of powder charges of different strength and location which can be selectively detonated in order to give the store being separated a desired separation characteristic.

It is another object of this invention to disclose an explosive bolt in which the powder charges are housed in a plurality of chambers which are formed in the process of assembling the bolt from its component parts. The component parts in turn are capable of being readily made by conventional machine tool procedures.

It is a further object of this invention to disclose apparatus for supporting stores which has hoisting apparatus incorporated therein for hoisting the store into position on the suspension apparatus. The hoisting apparatus may be fixed, partially or completely removable either in the pylon or aircraft structure. Ground handling equipment may also be used.

Other objects and many of the attendant advantages of this invention will be readily appreciated as the same becomes better understood by reference to the following detailed description when considered in connection with the accompanying drawings wherein:

Fig. 1 is a plan view of a pylon which is adapted to be affixed to the wing of an aircraft.

Fig. 2 is a partial elevational view of the pylon taken along line 2—2 of Fig. 1. This figure shows the explosive bolts in cross section.

Fig. 3 is a view, partially in cross section, part of which is taken on line 3—3 of Fig. 2, which shows how the store is loaded into position on the pylon.

Fig. 4 is an enlarged sectional view of the hoisting drum of the apparatus taken along line 4—4 of Fig. 2.

Fig. 5 is a diagram which shows the various types of ejection which may be achieved by the store suspension apparatus.

Fig. 6 is a wiring diagram which shows the various ways in which the explosive bolts may be detonated.

Reference is now made to Figs. 1 and 2 in which numeral 10 generally designates a pylon having an aerodynamically streamlined fairing 11. Forming a part of pylon 10 are body supports 12 and 13 which are rigidly connected to each other by braces 14 and 15. Fairing 11 is suitably attached to body supports 12 and 13 (connections not shown) in order to give the pylon a streamlined configuration such as shown in plan in Fig. 1. Body supports 12 and 13 are made of any suitable material having the required strength and rigidity. The body supports 12 and 13 are generally similar in construction and consist of central portions 16 and 17, respectively, each of the latter having a congruent counterpart. The congruent counterpart of central portion 17 is central portion 18, Fig. 4. The congruent central portion for central portion 16 is not shown in the drawings for the sake of clarity, however, it is to be understood that it bears the same relationship to central portion 16 as does congruent central portion 18 to central portion 17. This relationship will now be described. Central portion 17 is connected to central portion 18 by means of cross member 19, Figs. 2 and 4, and ejection tube housings 20 and 21, Fig. 2. The ejection tube housings 20 and 21 are formed integrally with body central portions 17 and 18 or are rigidly attached thereto. Cross member 19 has bore 22 therein for receiving a bolt or other suitable member for attaching the pylon 10 to the underside of the wing of an aircraft which is not shown. Body support 12 has cross member 23, and ejection tube housings 24 and 25 connecting it to its congruent counterpart, not shown. It will be noted that a bolt 26 is shown mounted in cross member 23 for attaching the pylon 10 to the underside of a wing of an aircraft. As stated above with respect to cross member 19, any suitable connecting member, and not necessarily a bolt such as 26, can be used for connecting purposes.

The ejection tube housings 20, 21, 24, and 25 all have generally cylindrical internal bores 27, 28, 29, and 30, respectively. It is into these bores that explosive bolt devices for attaching the store to the pylon 10 are adapted to fit. The explosive bolt devices will be described in detail hereafter. It is to be noted at this point that four ejection tube housings, 20, 21, 24, and 25 have been provided in pylon 10. It is to be further noted that only two of these tubes are to be used at any one time for the purpose of attaching a store to pylon 10. When relatively light stores are to be carried by the pylon 10, the explosive bolts which affix the store to the pylon are housed in ejection tubes 20 and 25 which are spaced more closely together than ejection tubes 21 and 24. It is in the latter ejection tubes in which the explosive bolts, which are affixed to the store, are housed when a relatively heavy store is to be carried by pylon 10.

The specific structure of an explosive bolt, which is capable of carrying out this invention will now be described, attention being directed to Figs. 2 and 3 wherein numeral 31 generally depicts an explosive bolt. This bolt consists of a threaded portion 32 which is adapted to fit into a mating tapped hole in store 33, Fig. 3. Attached to threaded portion 32 of bolt 31 is the smaller base of outwardly flaring frusto-conical portion 34 or a flat cylindrical shoulder or a spherical housing or any other suitable shape which is adapted to fit into a complementary recess 35 in store 33, as shown in Fig. 3. Integrally affixed to the wide surface of frusto-conical portion 34 is internally threaded hollow cylindrical portion 36 which has a smaller diameter than the wide base of frusto-conical portion 34. The junction of conical portion 34 with cylindrical portion 36 is recessed as at 37 to provide a weakened section between these two portions. This weakened portion will fracture easily when explosive charge 38 is detonated. Adapted to be screwed into the internally threaded part of cylindrical portion 36 is the externally threaded part 39 of central bolt portion 40, which in cooperation with cylindrical portion 36 forms a chamber for holding the above mentioned explosive charge 38. The end of central bolt portion 40, which is remote from externally threaded portion 39 is hollow and internally threaded as at 41. It will be noted that the junction between portions 39 and 41 of central bolt portion 40 is recessed as at 45 to facilitate the fracture of central bolt portion 40 at this point when explosive charge 43 is detonated. Adapted to be screwed into engagement with threads 41 is the externally threaded portion of plug 42, as shown in Fig. 2. Plug 42 cooperates with hollow internally threaded portion 41 of the bolt to produce an explosive chamber in which explosive 43 is placed. It will be noted at this point that explosive 43 is an ejection charge and that explosive 38 is a separation charge. The end of plug 42 which is remote from the above mentioned externally threaded portion is hollow and internally threaded as at 44 for the purpose of fastening the bolt to the pylon in a manner to be described hereafter. Centrally located within the internally threaded portion 44 of plug 42 is externally threaded post 46 which is utilized for aiding in the loading of the store on the pylon 10 which procedure will now be described.

In order to hoist the store into loaded position on the pylon 10, winch apparatus is incorporated into the pylon. A plurality of winches 57, 58, 59, and 60, Fig. 2, are mounted within the pylon 10. In Fig. 3, winch 58 is shown. Cable 61 has one end affixed to drum 62 of winch 58. The other end of cable 61 has coupling member 63 affixed thereto. Coupling member 63 consists of anchor portion 64 having collar 65 formed thereon. Anchor portion 64 is affixed to cable 61. Journalled on anchor portion 64 is internally threaded sleeve 66. Relative longitudinal movement between sleeve 66 and anchor portion 64 is prevented because collar 65 fits into a mating recess in sleeve 66, as shown in the drawing. In operation, cable 61 is lowered so that coupling member 63 comes into contact with post 46 of explosive bolt 31 which is attached to store 33. Sleeve 66 is then rotated so that it threads itself on to post 46. After sleeve 66 has been coupled to post 46, and a cable from another winch (not shown) has been coupled to another explosive bolt which has been affixed to the store, the drums on the winches are rotated and the store is hoisted into position relative to the pylon 10.

Winch 59, which is representative of the structure of all the winches, will now be described, attention being directed to Figs. 2 and 4. Winch 59 consists of a drum 69 which is journalled for rotation in arms 67 and 68 which extend from central portions 17 and 18, respectively, of body support 13, Fig. 4. More specifically, drum 69 is mounted on shaft 70 for rotation therewith by means such as set screw 71. Shaft 70 has a hexagonal bore 72, extending therethrough. The outer cylindrical portion 75 of shaft 70 is journalled in bearings 73 and 74 which are mounted in arms 67 and 68, respectively. A hexagonal wrench, not shown, which has a shape complementary to the hexagonal bore 72, is adapted to fit into the latter for the purpose of rotating the drum 69 and thereby hoisting the store into contact with the pylon. Mounted for sliding movement within hexagonal bore 72 are hexagonal closures 76 and 77. These closures are biased to the position shown in Fig. 4 by spring 78. The purpose of these closures is to close hexagonal bore 72 when a wrench is not positioned therein; that is, the outsides of closures 76 and 77 are caused to be flush with fairing 11. This construction is provided for reducing aerodynamic drag which would be caused if bore 72 were allowed to remain open. In order to hold closures 76 and 77 in hexagonal bore 72, hexagonal sleeves 79 and 80 are press fitted into hexagonal bore 72. Enlarged collars 81 and 82 on closures 76 and 77, respectively, abut against the ends of sleeves 79 and 80, respectively, as shown in Fig. 4, and thereby cause the outer surfaces of the closures to be flush with fairing 11 when the closures are in their spring biased positions. Any other suitable mechanical arrangement can be used for holding closures 76 and 77 within hexagonal bore 72. It can be readily seen, therefore, that suitable wrenches may be inserted into bores such as 72 for the purpose of rotating the drums within the pyon to therefore hoist a store which is affixed to the ends of cables such as 61. In actual practice a ratchet and pawl (not shown) may be mounted between drum 69 and either of the arms 67 or 68 for the purpose of locking the drum in any position thereof during the store hoisting process. This is a safety feature which prevents dropping of the store in case the wrench which turns drum 69 should slip for some reason. It will be noted that two cables are usually affixed to the store at one time and that these cables are wound on their respective drums simultaneously.

Attention is now directed to Fig. 3. Ejection tube 83 is adapted to be positioned within ejection tube housing 25. It is within this ejection tube that the explosive bolt is adapted to fit. The ejection tube acts in an analogous manner to a gun barrel so that when the ejection charge in the explosive bolt is detonated a portion of the bolt can be ejected from the ejection tube in the manner of a projectile. More specifically, ejection tube 83 consists of a substantially cylindrical portion 84 and an enlarged portion 175. It is proximate to section 175 that ejection charge 43 is positioned. A pressure chamber 176, Fig. 2, exists between bolt 31 and ejection tube 83 when bolt 31 is in assembled position within ejection tube 83. The volume of the pressure chamber 176 in conjunction with both the size of ejection charge 43 and the length of stroke from the recessed portion 45 of the explosive bolt 31 to the lower end of ejection tube 83 determines the ejection characteristic imparted to the store by the explosive bolt. It will be noted at this point that section 175 is enlarged for the purpose of allowing pressure reducing chamber 176 to be machined in various dimensions for giving different ejection characteristics to the store. When separation charge 38 is detonated, recessed portion 37 of bolt 31 is fractured. The gases produced by detonation of charge 38 are vented to the atmosphere after the rupturing of weak section 37, thus providing simple separation of the store. When ejection charge 43 is detonated, recessed portion 45 of bolt 31 is fractured. The gases produced by detonation of charge 43 are confined in chamber 176 to cause forcible ejection of the lower portion of bolt 31, and the store attached thereto, from ejection tube 83. By causing simple separation of one bolt and ejection of the other bolt, the store attached to the pylon 10 by the two bolts can be given a desired separation characteristic. The ejection tube 83 consists of a substantially cylindrical wall 84 and an inwardly flaring lip portion 85 which defines a centrally located opening (not numbered). In operation tube 83 is adapted to slip up into ejection tube housing 25. Lip portion 85 fits around the central portion of fastening sleeve 86 which, in turn, is used for fastening the explosive bolt within the pylon. Fastening sleeve 86 has a threaded end 87 which is adapted to engage the internal threads 44 of plug 42 in order to attach the bolt to the pylon. The other end of fastening sleeve 86 is formed into a skew bevel gear 88. Sleeve 86 is journalled in the internally extending portion 89 of ejection tube housing 25. It will be noted at this point that the portion of fastening sleeve 86 which mounts gear 88 has a larger diameter than the threaded end 87. It will be further noted that the central portion of sleeve 86 is of larger diameter than the threaded end. In positioning sleeve 86 within ejection tube housing 25 a bearing 90 is formed on sleeve 86 between these two enlarged portions. This subassembly is then inserted into the opening defined by internally extending portion 89 of the ejection tube housing, the bearing 90 being press fitted into said opening. It can thus be seen that fastening sleeve 86 will be held in the position shown in Fig. 3 since the internally extending portion 89 of the ejection tube housing 25 is straddled by the two enlarged portions of fastening sleeve 86.

A skew bevel gear 91, having a tubular extension 92 formed integrally therewith, is journalled in bearing 93 in the central portion 16 of body support 12, Figs. 2 and 3. Tubular extension 92 has a cylindrical outer configuration and a hexagonal inner configuration, Fig. 2, the latter extending through the gear 91. A hexagonal shaft 94 is adapted to be slidably inserted into the hexagonal bore of tubular extension 92 of skew bevel gear 91. When shaft 94 is in the position shown in Fig. 3, a wrench (not shown) is adapted to be applied to shaft 94 for the purpose of rotating the shaft and thereby rotating skew bevel gear 91 which is in mesh with skew bevel gear 88. It can thus be seen as gear 88 is rotated by gear 91 that fastening sleeve 86 will rotate. The threaded portion 87 of fastening sleeve 86 can therefore be threaded into the internal threads 44 of plug 42 of explosive bolt 31. In this manner the explosive bolt is secured within the ejection tube 83 which is positioned in the pylon 10. After this threading operation has been completed, hexagonal shaft 94 is slid through the hexagonal bore in the tubular extension 92 of gear 91 and inserted into a hexagonal hole 95 in the central portion of body support 12 which is congruent to central portion 16. In this manner the gear 91 and therefore the fastening sleeve 86 is locked against further rotation.

The foregoing description has set forth how an explosive bolt, which is attached to a store, is secured in position on the pylon. The large base of frusto-conical portion 36 of bolt 31 serves the function of securing the store rigidly to the pylon in such a manner that additional sway braces are not required. In Fig. 3 it is seen that a step 97 of smaller diameter than the large base of frusto-conical portion 36 of the bolt is formed on said base. This step is adapted to fit snugly within an ejection tube housing when the bolt is positioned as shown in Fig. 2. The outer portions of the large base of frusto-conical portion 36 abut the ends of the ejection tube housing when the explosive bolt is securely fastened with the ejection tube housing. It can be seen that this construction tends to hold the store securely against side forces which might be operative on the store.

The portion of the explosive bolt 31 by which detonation is accomplished will now be described, attention being directed to Figs. 2 and 6. Mounted in an insulating mold 50 on central bolt portion 40 of bolt 31 are conductive contact rings 47, 48, and 49. Insulating mold 50 insulates rings 47, 48, and 49 from each other and from central bolt portion 40. Explosive bolt 31 contains a simple separation powder charge 38 and an ejection powder charge 43. As mentioned above, by the selective detonation of these charges, simple separation or forcible ejection of the store supported by the explosive bolts may be obtained. In Fig. 6 it can be seen how conductors 52 and 56 connect contact rings 49 and 48 through primer 95 which is positioned in explosive charge 43. Likewise, conductors 51 and 55 connect contact rings 47 and 48 through primer 96 which is positioned in explosive charge 38. These features are not shown in Fig. 2 for the sake of simplicity. It is to be noted at this point, by way of explanation, that passing an electric current through either of the primers will cause detonation of the powder charges in which they are located. Contact rings 47, 48, and 49 are connected to a source of electricity through suitable contacts (not shown) which are affixed to the wall of the ejection tube in which the explosive bolt is mounted. These contacts may consist of spring pressed plungers mounted on the wall of the ejection tube which will engage the contact rings when the explosive bolt is positioned within the ejection tube.

Attention is now directed to Fig. 5 which pictorially depicts how explosive bolts which contain a plurality of powder charges can be used in order to give a store a desired separation characteristic. The store in this case is a bomb which is affixed to a pylon by two explosive bolts each having two explosive charges therein. In each bolt, one of the charges is for causing simple separation of the store and one is for causing positive ejection of the store. In Fig. 5 the position of each bomb is depicted after the same interval of time has elapsed after detonation. In the extreme left hand portion of Fig. 5 the ejection charge in the bolt at the nose of the bomb was exploded simultaneously with the simple separation charge in the bolt at the tail of the bomb. In this manner nose down ejection of the bomb was obtained. In the next figure the separation charge at the nose was exploded simultaneously with the ejection charge at the tail of the bomb. In this way tail down ejection of the bomb was obtained. In the next figure the ejection charges at the nose and tail of the bomb were detonated simultaneously. In this manner parallel ejection of the bomb was obtained. In the extreme right hand figure the separation charges at the nose and tail of the bomb were detonated simultaneously. In this manner simple separation of the bomb was obtained. Thus it can be seen that by using various combinations of charges various types of separation of a store may be obtained in order to overcome the pitching moments of different types of stores.

Attention is now directed to Fig. 6 of the drawings for a description of an electrical circuit for detonating the explosive bolts and thereby selectively obtaining any of the foregoing results. Explosive bolt 31, which has been described above, is schematically shown in this figure along with another explosive bolt 98, which is identical to explosive bolt 31. Explosive bolt 98 has two powder charges therein. Charge 99 is for producing ejection and charge 100 is for causing simple separation of the store. Charge 99 has primer 155 positioned therein and charge 100 has primer 156 positioned therein. These primers are connected to a source of electricity so that they can have a current passed therethrough. Those switches in the circuit which are controlled by solenoids are shown in positions which they occupy when the system is dormant. Battery 101 has one terminal connected to ground and the other terminal connected to master switch 102 which must be closed, as shown, in order to allow the circuit to operate. Conductor 103 leads from the switch 102 to one side of solenoid operated double pole switch 104 and to one side of triple pole switch 105. Conductor 106 leads from a common terminal between switch 102 and conductor 103 to bomb release switch 107 which must be only momentarily closed when release of the store is desired. Conductor 108 leads from switch 107 to one terminal of normally closed solenoid operated switch 135. Conductor 108 also leads to one side of fast acting solenoid 110, the other side of this solenoid being connected to ground through conductor 111. It can thus be seen that solenoid 110 will be energized as soon as switch 107 is closed which in turn will cause triple pole switch 105 to close. When switch 105 is closed, current will flow from conductor 103 through armature 129 of switch 105, then through conductor 130 through armature 109 of switch 135 and then through solenoid 110 to ground. The foregoing circuitry makes possible the energizing of the circuit by only momentarily closing switch 107, that is, by having an initial current flow through solenoid 110, switch 105 will close and remain closed. When switch 105 is closed conductor 103 will be connected to conductor 112 through armature 113. Conductor 112 in turn leads to contacts 114 and 115 of gang switch 116. Contact 114 can be selectively engaged with either one of contacts 117, 118, 119, or 120 of switch 116. Contact 115 on the other hand can be selectively engaged with either one of contacts 121, 122, 123, or 124 of switch 116. It is to be noted at this point that when contact 114 engages contact 117, contact 115 will engage contact 121, and when contact 114 engages contact 118, contact 115 will engage contact 122 etc. It will be further noted that contacts 117 and 119 are common to conductor 125, and that contacts 118 and 120 are common to conductor 126. Contacts 122 and 123 are common to conductor 127, and contacts 121 and 124 are common to conductor 128. It can thus be seen that when contact 114 engages contact 117, that current will flow through conductor 125 through primer 155 in ejection charge 99 in explosive bolt 98 thence through conductor 111 to ground. In this way ejection charge 99 in explosive bolt 98 is detonated. Since contact 115 is in engagement with contact 121 at this time current will flow through conductor 128, through primer 95 in ejection charge 43 of explosive bolt 31, and then through conductors 136 and 111 to ground. In this way the ejection charges in explosive bolts 98 and 31 will be detonated at the same time to obtain the parallel ejection characteristic of the store as shown in Fig. 5. It can also be seen that when contact 114 is in engagement with contact 118 and when contact 115 is in engagement with contact 122, that by following the circuitry in the manner explained above, the separation charges 38 and 100 will be detonated to give plain separation as shown in Fig. 5. When contacts 114 and 115 engage contacts 119 and 123, respectively, the ejection charge 99 in bolt 98 will be detonated and the separation charge 38 in bolt 31 will be detonated to give the nose down ejection shown in Fig. 5. Lastly, when contacts 114 and 115 engage contacts 120 and 124, respectively, the separation charge 100 in bolt 98 will be detonated simultaneously with the ejection charge 43 in bolt 31 to give the tail down ejection shown in Fig. 5.

After the detonation of two of the four powder charges has been achieved in the manner described above, the circuit causes the detonation of the remaining two charges after a predetermined time has elapsed. This feature is provided as a safety measure in order to insure complete separation of the store from the pylon in case initial detonation was faulty or incomplete. When solenoid 110 closes switch 105 to cause the above described primary detonation to occur, armature 131 of switch 105 connects conductor 103 to conductor 132 which in turn is connected to one end of slow closing-slow opening solenoid 133, the other end of the solenoid being connected via conductors 134 and 111 to ground. Therefore after a predetermined time interval after energization of solenoid 110, as determined by the time of energization required for solenoid 133, double pole switch 104 will be closed by solenoid 133. When this closing occurs, armature 137 of switch 104 connects conductor 103 to conductor 138 which in turn leads to contacts 139 and 140. Contact 139 can selectively engage either one of contacts 141, 142, 143, or 144 depending on the position of gang switch 116. Contact 140, on the other hand, can selectively engage either one of contacts 145, 146, 147, or 148 depending on the position of gang switch 116. It can be readily seen from the drawing that when contact 114 of gange switch engages contact 119, contact 115 will engage contact 123, contact 139 will engage contact 143, and contact 140 will engage contact 147. In short, movable contacts 114, 115, 139, and 140 will all engage corresponding stationary contacts as determined by the position of the gang switch. Contacts 141 and 143 are connected to conductor 149 which leads through primer 156 in explosive bolt 98 to conductor 111 which in turn is connected to ground. Contacts 142 and 144 are connected to conductor 150 which leads to primer 155 in bolt 98, the primer, in turn, being connected through conductor 111 to ground. Contacts 145 and 148 are connected to conductor 127 which is connected to bolt 31 in the manner described above; and contacts 146 and 147 are connected to conductor 128 which is connected to bolt 31 in the manner described above. If gang switch 116 is in the position wherein contact 114 engages contact 117, and contact 115 engages contact 121, powder charges 99 and 43 are initially detonated, as described above. It can be further seen that gang switch contacts 139 and 140 will engage contacts 141 and 145, respectively at this time. Therefore when solenoid 133 closes switch 104 a predetermined time after the initial detonation, current will be passed through the primers 156 and 96 to detonate the remaining two powder charges 100 and 38. More specifically, when switch 104 is closed, current will flow from battery 101 through conductor 103, armature 137, conductor 138, conductor 149, primer 156, and conductor 111 to ground. Current will also flow from the battery, through conductor 103, armature 137, conductor 138, conductor 127, primer 96, conductor 136 and 111 to ground. By following the circuitry in a similar manner it can be readily seen that gang switch 116 and the contacts associated therewith are so arranged that primary detonation of any two powder charges will initially occur, followed by secondary detonation of the remaining two powder charges.

An additional slow open-slow close solenoid 151 is provided in the circuit for opening normally closed switch 135 and thereby returning the solenoid operated switches 104 and 105 to the position shown in Fig. 6. More specifically, it can be seen from the drawing that current can flow from battery 101 through conductor 103 through the armature 152 of switch 104, when this switch is closed, through conductor 153, then through solenoid 151 to ground. When solenoid 151 is energized in this manner, it will open switch 135. The circuit to solenoids 110 and 133 will therefore be broken and switches 105 and 104 will return from their closed position to the position shown in the drawing.

There is an alternate way of energizing the circuit and that is by utilizing a signal input from a bombsight or other equipment in lieu of momentarily closing switch 107. As can be seen from Fig. 6 a signal input from an external source is applied to conductor 154 which energizes the circuit in the same manner as the closing of switch 107.

Obviously many modifications and variations of the present invention are possible in the light of the above teachings. It is therefore to be understood that within the scope of the appended claims the invention may be practiced otherwise than as specifically described.

What is claimed is:

1. A system for releasably fastening a store to a fixed member comprising a plurality of explosive bolts for providing the sole connection between said store and said fixed member, each of said bolts having a body portion, a plurality of explosive chambers formed in each of said body portions, an explosive charge positioned in each of said explosive chambers, an ejection tube mounted on said fixed member engagingly surrounding said body portion and extending past at least one of said charges toward said store whereby when said one charge is detonated the separated portion of said bolt and said tube are in piston and cylinder relationship, said ejection tubes forming a pressure chamber for the gases of said one of said explosive charges of each bolt, and detonating means coupled to said explosive charges for selectively detonating a certain charge in each bolt to thereby release said store from said fixed member and give said store a desired separation characteristic for overcoming adverse aerodynamic and inertia forces and moments acting on said store.

2. A system for releasably fastening a store to a fixed member comprising a plurality of explosive bolts for providing the sole connection between said store and said fixed member, each of said bolts comprising a body portion, at least two chambers formed in each of said body portions, an explosive charge positioned in each of said chambers, a plurality of ejection tubes mounted on said fixed member, each of said tubes engagingly surrounding each of said body portions and extending past said charges toward said store whereby when said one charge is detonated the separated portion of said bolts and said tubes are in piston and cylinder relationship, and detonating means coupled thereto to selectively detonate said charges in each of said bolts to thereby release and eject said store from said fixed member and give said store a desired separation characteristic for overcoming the adverse aerodynamic and inertia forces and moments acting on said store.

3. A system for releasably fastening a store to a fixed member comprising a plurality of explosive bolts for providing the sole connection between said store and said fixed member, each of said bolts having a body portion, explosive charges of varying strengths housed in each of said bolt body portions, a plurality of ejection tubes, each of said tubes mounted on said fixed member and engagingly surrounding each of said body portions and extending past said charges toward said store whereby when said one charge is detonated the separated portion of each of said bolts and said tubes are in piston and cylinder relationship, and detonating means coupled to said explosive charges for selectively detonating said charges to fracture each of said bolts and thereby separate and eject said store from said fixed member and give said store a desired separation characteristic for overcoming the adverse aerodynamic and inertia forces and moment acting on said store.

4. A system utilizing a plurality of explosive bolts for releasably affixing a first member to a second member, said system comprising explosive bolts, each of said bolts having a body portion, first means on one end of each of said body portions for attachment to said first member, second means on the other end of each of said body portions for attachment to said second member, said bolts thereby being capable of joining said first and second members, a plurality of explosive means housed within each of said body portions for selectively giving different explosive force characteristics, a plurality of ejection tubes, each of said tubes engagingly surrounding said body portion and extending past at least one of said explosive means toward said store whereby when said one explosive means is detonated the separated portion of each of said bolts and said tubes are in piston and cylinder relationship, and detonating means coupled to said explosive means for selectively detonating said explosive means to thereby fracture said body portions and separate and eject said first and second members, the force of separation of said members being determined by the force of the explosive means which is detonated and the location relative to the end of each of the tubes of the explosive charge.

5. A system for releasably fastening a store to a fixed member comprising a plurality of explosive bolts for providing the sole connection between said store and said fixed member, each of said bolts having a body portion and providing sway brace characteristics, a plurality of explosive means housed in each of said body portions for giving different explosive force characteristics, a plurality of ejection tubes, each of said tubes being mounted on said fixed member and engagingly surrounding each of said body portions and extending past at least one of said explosive means toward said store whereby when said one means is detonated the separated portion of each of said bolts and said tubes are in piston and cylinder relationship, and detonating means coupled to said explosive means to selectively detonate said explosive means to thereby release said store from said fixed member.

6. A store supporting apparatus comprising, in combination, first means for bringing a store into contact with a pylon which is adapted to support said store, and second means for both holding said store on said pylon and for releasing said store therefrom, said first means comprising a plurality of housings in said pylon, a winch associated with each of said housings, a cable operatively affixed to each of said winches, said cables extending through each of said housings for attachment to said store, said second means comprising a plurality of explosive bolts, each of said bolts comprising a body portion, first fastening means formed on one end of each of said body portions for attachment to said store, second fastening means formed on the other end of each of said body portions and including means for attachment to each of said cables, whereby said store can be attached to said cables and moved into contact with said pylon so that said explosive bolts are then positioned in said housings, said second fastening means cooperating with other means within said housing for locking said bolts within said housings, interengaging means positioned relative to said bolts and pylon for rigidly holding said store against external forces, at least two chambers formed in each of said bolts, explosives housed in each of said chambers, a plurality of ejection tubes, each of said tubes mounted in a respective housing and engagingly surrounding each of said bolts and extending past at least one of said charges toward said store whereby when said one charge is detonated the separated portion of said bolts and said tubes are in piston and cylinder relationship, and detonating means coupled to said bolts for selectively detonating the explosives contained within said bolts to thereby separate and eject said store from said pylon by fracturing each of said bolts and giving said store a desired separation characteristic which will overcome the adverse aerodynamic and inertia forces and moments acting on said store.

7. A store supporting apparatus comprising, in combination, first means for bringing a store into contact with a pylon which is adapted to support said store, second means connected to said first means for both holding said store on said pylon and for releasing said store therefrom, said second means comprising a plurality of explosive bolts for fastening said store to said pylon after said store has been moved into contact with said pylon, means formed integrally with each of said bolts for rigidly holding said store against movement caused by external forces, two chambers formed in each of said bolts, explosives housed in each of said chambers, a plurality of ejection tubes, each of said tubes engagingly surrounding said bolts and extending past one of said charges toward said store whereby when said one charge is detonated the separated portion of each of said bolts and said tubes are in piston and cylinder relationship, and detonating means coupled to said explosive for selectively detonating the explosives to thereby separate and eject said store from said pylon and give said store a desired separation characteristic which will overcome the store adverse aerodynamic and inertia forces and moments acting on said store.

References Cited in the file of this patent

UNITED STATES PATENTS

| | | |
|---|---|---|
| 2,411,647 | Bonnell et al. | Nov. 26, 1946 |
| 2,421,807 | Richey et al. | June 10, 1947 |
| 2,556,672 | Bergh et al. | June 21, 1951 |
| 2,604,353 | Pierson et al. | July 22, 1952 |
| 2,653,504 | Smith | Sept. 29, 1953 |
| 2,679,783 | Smith | June 1, 1954 |
| 2,685,423 | Meadowcroft et al. | Aug. 3, 1954 |
| 2,713,287 | Domoj | July 19, 1955 |
| 2,726,576 | Musser | Dec. 13, 1955 |
| 2,815,698 | Burrows | Dec. 10, 1957 |

FOREIGN PATENTS

| | | |
|---|---|---|
| 497,009 | Great Britain | Dec. 8, 1938 |
| 56,948 | Holland | Sept. 15, 1944 |
| 1,088,492 | France | Sept. 8, 1954 |